F. M. GILTNER.
ANIMAL FEEDER.
APPLICATION FILED OCT. 16, 1913.
1,138,102. Patented May 4, 1915.
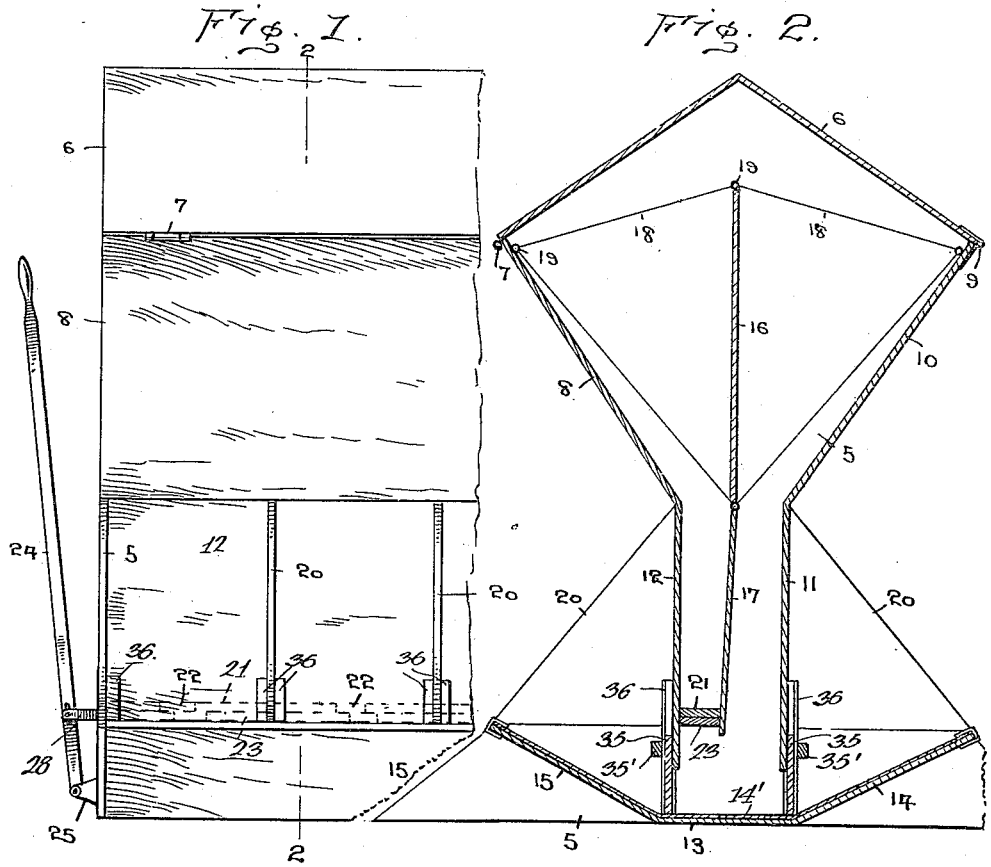
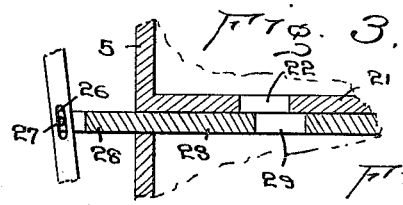
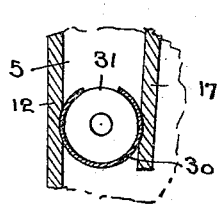
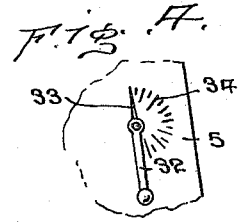
F. M. Giltner
INVENTOR
Attorneys
WITNESSES

UNITED STATES PATENT OFFICE.

FRANCIS MARTIN GILTNER, OF WINFIELD, KANSAS.

ANIMAL-FEEDER.

1,138,102.  Specification of Letters Patent.  Patented May 4, 1915.

Application filed October 16, 1913. Serial No. 795,599.

*To all whom it may concern:*

Be it known that I, FRANCIS MARTIN GILTNER, a citizen of the United States, residing at Winfield, in the county of Cowley and State of Kansas, have invented certain new and useful Improvements in Animal-Feeders; and I do hereby declare the following to be a full, clear, and exact description of the invention, such as will enable others skilled in the art to which it appertains to make and use the same.

This invention relates to animal feeders and contemplates the construction of a feeder which will be sanitary and easily cleaned.

One of the principal objects of my invention is to provide a feeder adapted for use with both wet and dry feeds.

A further object is to provide a feeder having means for regulating the flow of food and for measuring the amount required.

A still further object is to provide a feeder which will be simple, durable and efficient in operation and inexpensive to manufacture.

With these and other objects in view the invention consists in the construction, combination and arrangement of parts hereinafter more fully described and claimed, and illustrated in the accompanying drawings, in which like reference characters indicate like parts throughout the several figures and in which, Figure 1 represents a side elevational view of one end of the feeder, Fig. 2 represents a transverse sectional view on the line 2—2 of Fig. 1, Fig. 3 represents a vertical transverse sectional view through one end of the feeder showing the food regulating means, Fig. 4 represents a fragmental view of a portion of one end of the feeder, showing the dial means for indicating the throw of one embodiment of the measuring device, Fig. 5 represents a transverse sectional view of a portion of the funnel of the feeder, showing the embodiment of measuring device used in connection with the dial means shown in Fig. 4.

Referring more particularly to the drawing, 5 indicates the end boards of the feeder, said boards having their upper edges beveled to provide a substantially inverted V-shaped rest for a top 6 which is hinged at 7 to one of the side walls 8 of the hopper of the feeder, said top provided with a latch 9 whereby it may be secured in closed position to the opposite side wall 10 of the hopper.

The walls 8 and 10 of the hopper converge downwardly and are secured to the end walls 5 of the device, said walls being beveled to allow the downward convergence of the walls 8 and 10 of the hopper. A pair of vertical walls 11 and 12 are secured between the end walls 5, and abut at their upper edges against the lower edges of walls 8 and 10, said walls 11 and 12 being spaced apart and forming what may be termed a funnel. Between the lower portions of end walls 5 a horizontal bottom board 13 is secured, and together with the boards 14 and 15 form a feeding trough, which may be lined with a substantially semi-circular strip of metal as shown at 14' if desired, said boards 14 and 15 being secured between end walls 5 and diverging upwardly from the bottom board 13. The lower ends of walls 11 and 12 are spaced from the bottom board 13.

Extending vertically between end walls 5 is an upper partition 16, which is equidistant from the walls 8 and 10 and which has its lower edge pivoted upon a line with the lower edges of said walls. A lower partition 17 extends from partition 16 downwardly toward the bottom 13, said partition 17 being slightly inclined toward wall 12 of the funnel. A number of brace wires or rods 18 have their ends secured in eyes 19 and brace the partition 16 to walls 8 and 10 of the hopper, but the wires may be removed when the partition is tilted against one of the walls 8, or 10.

At intervals throughout the length of the feeder, triangular partitions 20 are secured at one edge to each of the walls 11 and 12 of the funnel and rest at their lower edges against the upper edges of boards 14 and 15 of the bottom, and said partitions form a plurality of stalls, adapted to separate animals from each other while the same are feeding.

The feed regulator device illustrated in Figs. 1, 2 and 3 comprises a board or bottom 21 secured horizontally between the lower end of partition 17 and the wall 12, near the bottom of the latter, and extends the length of the feeder, and is provided with a plurality of openings 22 situated preferably one at the central portion of each stall, and said bottom 21 is adapted to coact with a slide 23 which is of the same width as bottom 21 and which has its end slidably received in slots in the end walls 5, and is adapted to be operated by means of a lever 24 pivoted at its lower end in the lug 25 secured to one of the ends of the feeder and which is provided with a slot 26 adapted to slidably receive a pin 27 connecting the arms of the bifurcated end 28 of slide 23. The slide is provided with openings 29 adapted to be brought into registration with openings 22 to permit the entrance of food into the trough from the side of the funnel in which the bottom 21 is situated.

The feed regulator illustrated in Fig. 5 comprises a long cylinder 30 pivoted in the end walls 5 of the feeder and said cylinder is situated in the funnel at approximately the same point occupied by the feed regulating device illustrated in Fig. 2. When the cylinder 30 is used the partition 17 and walls 12 will be slightly concaved to form a bearing for the side of the cylinder. The cylinder 30 is slotted as at 31, the slot running the entire length of the cylinder, so as to allow food to pass from the upper portion of the funnel into the cylinder, and the cylinder is adapted to be tilted by means of a crank 32, which is connected to a stub shaft on the cylinder extending through one of the end walls 5, said crank being positioned on the outside of the end wall. The crank 32 is provided with a pointer 33 which is adapted to register with the end one of a series of graduations 34 on the wall 5, when the cylinder is in the position indicated by Fig. 5, and said graduations are adapted to indicate at what angle the cylinder should be tilted to allow the flow of a predetermined weight of food therethrough, it being understood that no feed will be admitted to the trough until the slot 31 has passed below the horizontal axis of the cylinder, and when this position is reached, the solid portion of the cylinder will be uppermost and will prevent food from passing into the trough.

The partitions 20 may have slides 35 positioned vertically between them, said slides adapted to be used when the device acts in the capacity of a self-feeder, said slides adapted to be raised by the noses of the animals to be fed engaging the under side of the horizontal bar 35′ arranged upon the outer side of each of the slides 35. The slides are positioned against the walls 11 and 12 by means of the guide strips 36 secured to the partitions 20 and to the bottom 13 in spaced relation to walls 11 and 12.

My feeder is primarily intended for the feeding of hogs, and for this purpose the portion of the funnel to the right of partition 17 is left open and unobstructed so that, when the cover 6 is raised, liquid food for the swine may be poured into the trough adjacent the partition 17, through the funnel.

The portion of the funnel to the left of partition 17 in Fig. 2, is adapted to receive dry food such as grain, the means for regulating the flow of grain into that portion of the trough left of the partition 17 having been previously described.

It will be understood that the funnel and hopper above the feed regulating device may be completely filled so that from day to day only enough food as is required may be let down into the adjacent trough, thus making it unnecessary to fill the hopper every day. The food will be kept in dry state by reason of the cover 6, which will prevent any rain water from getting to it.

The feed regulating device illustrated in Fig. 5, is especially adapted for use when sheep are fed from the feeder, for the reason that the amount of food given a sheep when it is young is very small and is increased gradually from time to time, and by means of the pointer 33 and the graduations 34, the degree of rotation of the cylinder 30 and the position of the slot 31 can be readily determined and very accurate amounts can be let into the trough beneath cylinder 30, it being previously known what amount will be let out of the cylinder by adjusting the crank 32 at the end of the cylinder 30 in such manner that the pointer 33 will properly register with the various graduation marks. In using the device as a sheep feeder it will be desirable to lay partition 16 against wall 10, so that the entire hopper may be filled, and the food may be measured out by the cylinder as described, it being evident that by having the partition 16 movable, the feeder may be used for feeding different species of animals, without changing its construction. However, I reserve the right to use partition 16 and 17 or not, as I may desire.

The partition 17 diverges downwardly from the wall 11 so that there will be no liability of lodgment of the food, or danger of the same becoming clogged up between the walls 11 of the funnel and the partition 17.

It will be noted that the feeder is free from corners and crevices which might become lodged with food, so that the device may be very easily cleaned and kept in a sanitary condition.

Although I have described the preferred construction of my invention, I may desire to make such changes in the construction, combination and arrangement of parts thereof as do not depart from the spirit of the invention and the scope of the appended claims.

What I claim as new is:

1. A feeder comprising vertical end walls, downwardly converging walls secured thereto, spaced vertical walls secured thereto and resting at their upper ends against the lower ends of said converging walls, a horizontal bottom wall secured between said end walls and spaced from said vertical walls, upwardly diverging walls secured between said end walls and resting at their lower ends against said bottom wall, an upper pivoted partition arranged between said end walls semi-distant from said downwardly converging walls to alternately control the admission to either discharge point made thereby, a lower partition secured between said vertical walls and inclined toward one of the vertical side walls and having its lower edge adjacent said bottom wall, oppositely disposed triangular partitions secured vertically to said vertical walls and resting upon the upper edge of said upwardly diverging walls and spaced from each other, and means between said inclined partition and one of said vertical walls for regulating the flow of food downwardly between said inclined partition and the wall toward which it is inclined, the space between said inclined partition and the opposite vertical wall being left unobstructed.

2. A feeder comprising side and end walls, transverse sectional walls, a multiple feeding trough at the bottom thereof, a hopper having converging side walls at the top of said feeder, a discharge device from said hopper, commencing at the bottom of said converging side-walls and running to just short of said trough, a division wall disposed in said hopper, adjustably pivoted to control a discharge into said hopper discharging device, a division wall in said hopper discharge device, commencing at the pivot point of said division wall, running to said trough and inclined to one of the side walls of said hopper discharging device, a feed regulator between said side wall and said inclined division wall, and an adjustable indicating means attached to said feed regulator for determining the quantity of feed dispensed.

3. The combination of a superposed hopper, a discharge device leading from said hopper to a trough, a trough below said discharging device, an adjustable and pivoted partition wall in said hopper, an inclined partition wall in said discharging device, an adjustable feed regulator between said inclined partition wall and one of the side walls of said discharging device, section walls in said trough to provide stalls, and vertical slides in each of said stalls.

In testimony whereof I have signed my name to this specification in the presence of two subscribing witnesses.

FRANCIS MARTIN GILTNER.

Witnesses:
LEWIS BAYS,
M. B. GRIFFITH.

Copies of this patent may be obtained for five cents each, by addressing the "Commissioner of Patents, Washington, D. C."